(12) United States Patent
Li

(10) Patent No.: US 10,362,015 B2
(45) Date of Patent: Jul. 23, 2019

(54) METHOD OF GENERATING MULTIPLE IDENTIFICATIONS WITH MULTI-LEVEL SECURITY FOR NETWORK-CONNECTED DEVICES

(71) Applicant: MediaTek Inc., Hsinchu (TW)

(72) Inventor: Hungwen Li, Cupertino, CA (US)

(73) Assignee: MediaTek, Inc., Hsinchu (TW)

( * ) Notice: Subject to any disclaimer, the term of this patent is extended or adjusted under 35 U.S.C. 154(b) by 341 days.

(21) Appl. No.: 15/292,367

(22) Filed: Oct. 13, 2016

(65) Prior Publication Data

US 2018/0019988 A1    Jan. 18, 2018

Related U.S. Application Data

(60) Provisional application No. 62/362,080, filed on Jul. 14, 2016.

(51) Int. Cl.
*H04L 29/06* (2006.01)
*G06F 9/4401* (2018.01)
*H04W 4/70* (2018.01)
*H04W 12/02* (2009.01)

(52) U.S. Cl.
CPC ............ *H04L 63/08* (2013.01); *G06F 9/4401* (2013.01); *H04L 63/105* (2013.01); *H04L 63/205* (2013.01); *H04W 4/70* (2018.02); *H04W 12/02* (2013.01)

(58) Field of Classification Search
CPC  G06F 21/305; H04L 63/0853; H04L 65/1069
USPC .......................................................... 726/7
See application file for complete search history.

(56) References Cited

U.S. PATENT DOCUMENTS

| | | | |
|---|---|---|---|
| 8,509,431 B2 | 8/2013 | Schmidt | |
| 9,503,438 B2 | 11/2016 | Choyi | |
| 2008/0108333 A1* | 5/2008 | Jemison | H04W 88/18 455/414.1 |
| 2008/0133716 A1 | 6/2008 | Rao et al. | |
| 2008/0262776 A1* | 10/2008 | Yamasaki | G16H 10/40 702/108 |
| 2011/0072507 A1* | 3/2011 | Johnston, II | H04L 63/0853 726/12 |
| 2012/0066499 A1* | 3/2012 | Ali | G06F 21/305 713/170 |
| 2016/0105531 A1* | 4/2016 | Godfrey | H04W 4/70 714/47.1 |
| 2016/0338120 A1* | 11/2016 | Boyle | H04L 65/1069 |

FOREIGN PATENT DOCUMENTS

EP    2178259 A2    4/2010

* cited by examiner

*Primary Examiner* — Bryan F Wright
(74) *Attorney, Agent, or Firm* — Tong J. Lee

(57) ABSTRACT

A network-connected device is identified by multiple keys for multiple security levels in a network. From the network, the device detects a request directed at the device. The device identifies, from the request, a source entity that sent the request and a security level specified by the request. Among the plurality keys that identify the device for different levels of security, the device determines one or more of the keys to identify the device according to at least the security level. In response to the security level being a high security level, the device establishes a network session with the high security level to communicate with the source entity using a set of inter-related keys among the plurality of keys.

18 Claims, 5 Drawing Sheets

METHOD OF GENERATING MULTIPLE IDENTIFICATIONS WITH MULTI-LEVEL SECURITY FOR NETWORK-CONNECTED DEVICES

CROSS-REFERENCE TO RELATED APPLICATIONS

This application claims the benefit of U.S. Provisional Application No. 62/362,080 filed on Jul. 14, 2016.

TECHNICAL Field

Embodiments of the invention relate to a multi-level security mechanism implemented in network-connected devices.

BACKGROUND

In the Internet-centric society today, every individual can be identified by many identifications (IDs) including name, passport number, driver license ID, passwords, account numbers, badge ID number, membership ID, etc. Various aspects of the society depend on these IDs to operate; for example, banking, stock trading, tax collection, supply chain management, shopping, e-Commerce, government operation, clubs, just to name a few. Different IDs may be used in different environments and in different societal activities.

With the emerging applications of the "Internet of Things" (IoT), there are more "things" connected to the Internet. Each "Internet-connected thing" needs one or more IDs to support the operation of IoT activities. Therefore, there is a need for the Internet-connected things to be identified by multiple IDs. Similar to a person having many IDs and using different IDs in different occasions, it is necessary for each Internet-connected thing to have multiple IDs and each thing uses different IDs in different IoT operations.

Currently, billions of semiconductor chips are fabricated every year, and billions of IoT things with embedded semiconductor chips are produced every year. Therefore, the generation, storage, manipulation and compatibility of the IDs for each semiconductor chip are essential for the IoT ecosystem.

An example of a conventional ID is the barcode, which is widely used in today's supply chain management. Each item is given a barcode as its ID during its lifecycle in the supply chain. As the Internet emerges and e-Commerce continues to replace physical stores, the barcode becomes inadequate in dealing with the security requirements in many aspects of IoT operations. Thus, there is a need for improving the ID generation and management in network-connected devices. As a semiconductor supplier, there is a need to design an identification mechanism for every chip shipped.

SUMMARY

In one embodiment, a method is provided for identifying a device in a network. The method comprises: detecting, from the network, a request directed at the device; identifying, from the request, a source entity that sent the request and a security level specified by the request; determining, among a plurality keys that identify the device for different levels of security, one or more of the keys to identify the device according to at least the security level; and in response to the security level being a high security level, establishing a network session with the high security level to communicate with the source entity using a set of inter-related keys among the plurality of keys.

In another embodiment, an apparatus is provided for identifying a device in a network. The apparatus comprises: memory to store a plurality keys that identify the device for different levels of security; an allocator to manage memory allocation for a data structure that stores at least a set of inter-related keys for identifying the device at a high level of security; and a controller coupled to the memory and the allocator. The controller is operative to: detect, from the network, a request directed at the device; identify, from the request, a source entity that sent the request and a security level specified by the request; determine one or more of the keys among the plurality keys to identify the device according to at least the security level; and in response to the security level being the high security level, establish a network session with the high security level to communicate with the source entity using the set of inter-related keys.

BRIEF DESCRIPTION OF THE DRAWINGS

The present invention is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one. Further, when a particular feature, structure, or characteristic is described in connection with an embodiment, it is submitted that it is within the knowledge of one skilled in the art to effect such feature, structure, or characteristic in connection with other embodiments whether or not explicitly described.

DETAILED DESCRIPTION

In the following description, numerous specific details are set forth. However, it is understood that embodiments of the invention may be practiced without these specific details. In other instances, well-known circuits, structures and techniques have not been shown in detail in order not to obscure the understanding of this description. It will be appreciated, however, by one skilled in the art, that the invention may be practiced without such specific details. Those of ordinary skill in the art, with the included descriptions, will be able to implement appropriate functionality without undue experimentation.

Embodiments of the invention provide a system and method for generating identifications (IDs) for network-connected devices. The devices are provided with multiple IDs such that they may use different IDs in different usage scenarios that require different levels of security. The system and method enable a device to identify itself in the Internet ecosystem, authenticate itself in Internet transactions, support traditional supply chain logistics, support e-Commerce, and actively interact with Internet servers, cloud and other devices. In one embodiment, the devices are provided with multiple IDs with different security levels for different network security protocols, different network operations, and/or different network platforms. Furthermore, the devices also have the intelligence to use its IDs to interact with other devices, such as servers, cloud, and peer devices, over the Internet.

In the disclosure herein, the term "Internet" is broadly used to refer to any wired network, wireless network, or a combination thereof, including but not limited to a proprietary network and/or a public network.

Moreover, the terms "ID" and "key" are used interchangeably. Key is used as a collective name for device ID, group ID, shared secret, cryptographic key, certificate or signature, etc. A key may be used by two communicating entities: a client and server, an endpoint and cloud, or any network-connected entities. A key may be used to identify an individual entity, or a closely-related group. A key may be used in a two-phase process. For example, in Phase One: a sender and a receiver exchange a key to establish a secure channel; in Phase Two, a sender uses the key to encrypt a message or data, and a receiver uses the key to decrypt the message or data.

The ID generation method to be described herein supports all protocol standards across the industry and all Internet platforms. Furthermore, the ID generation method supports the fundamental data structures that are widely adopted in industry. The operations for manipulating the data structures are universal to all protocols.

Figure 1:
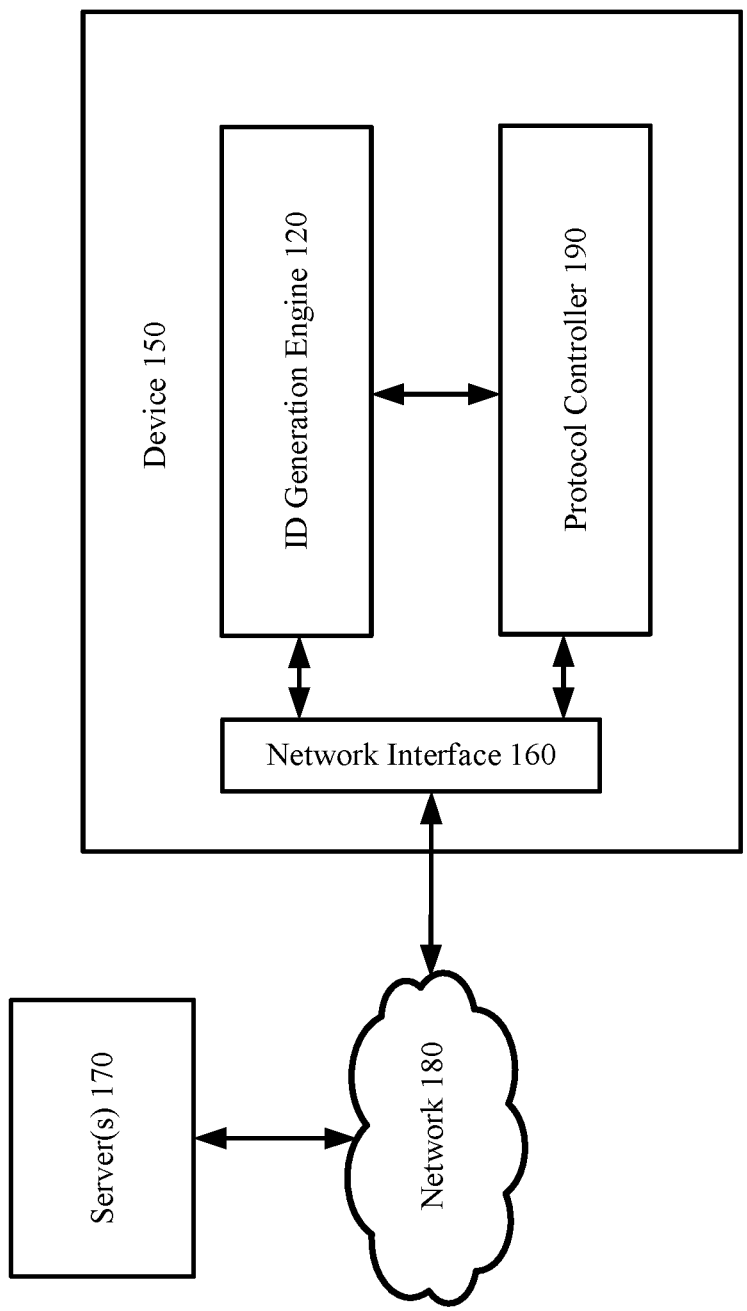
FIG. 1 illustrates an environment in which a network-connected device may operate according to one embodiment.

FIG. 1 illustrates an environment in which a network-connected device 150 may operate according to one embodiment. In one embodiment, the device 150 may be a computer, a smartphone, an e-reader, an appliance, a car, a portable or wearable device, or anything connected to a network 180 such as the Internet. In another embodiment, the device 150 may be a semiconductor chip connected to the network 180. The device 150 may be a client that interacts with one or more servers 170 via the network 180; alternatively, the device 150 may be an endpoint that interacts with the servers 170 in a cloud computing environment (herein referred to as the cloud). In one embodiment, the device 150 includes a network interface 160 to communicate with the network 180, an ID generation engine 120 and a protocol controller 190. Details about the ID generation engine 120 and the protocol controller 190 are provided below.

Figure 2:
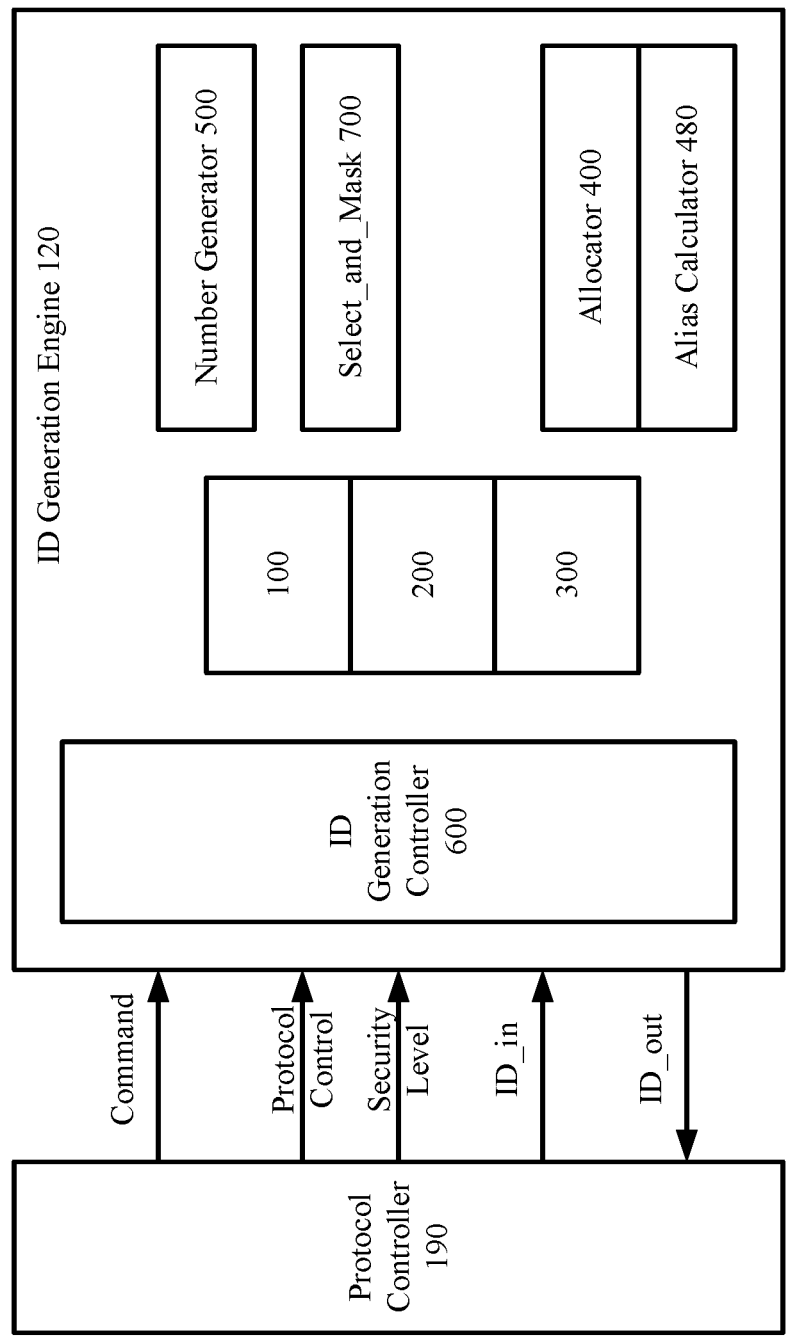
FIG. 2 illustrates an ID generation engine in a network-connected device according to one embodiment.

FIG. 2 illustrates the ID generation engine 120 according to one embodiment. The ID generation engine 120 may be located in or attached to a network-connected device; e.g., the device 150 of FIG. 1. In one embodiment, the ID generation engine 120 includes or has access to a memory, which stores data that can be used as keys or can be used to derive the keys for identifying itself or its group. The data stored in the memory may be generated locally by the ID generation engine 120, may be downloaded from the network, or may be pre-installed before shipping by the manufacturer of the device or semiconductor chip in which the ID generation engine 120 is located.

The ID generation engine 120 supports all protocols and Internet platforms through multiple data structures and Universal operations on data structures. Keys can be generated locally; e.g., by a random number generator (RNG), a pseudo random number generator (PRNG), or from random patterns pre-downloaded from external sources, or generated in real-time through cryptographic techniques. Key can be supplied externally, through a protocol, provided by an Internet platform or an industrial organization (that the manufacturer is a member and receives a batch of keys/identifications for shipping). Keys can be installed by the manufacturer of a device or a semiconductor chip before shipping.

In the embodiment of FIG. 2, the memory of the ID generation engine 120 includes at least three blocks: block 100 stores a set of one-dimensional linear arrays, block 200 stores a two-dimensional data structure and block 300 stores a set of linked lists.

In block 100, each one-dimensional linear array stores a bit pattern, which may be a locally generated random bit pattern, a pre-generated random bit pattern, or a bit pattern provided externally by an Internet platform (e.g., from Apple®, Google®, Amazon®, a bank, an e-Commerce portal, and the like).

More specifically, the bit pattern of each one-dimensional liner array in block 100 may come from one or more sources. For example, a first source may be a number generator 500. As will be described below, the number generator 500 generates random numbers and/or pseudo-random numbers. A command can instruct the number generator 500 to locally generate a random or pseudo-random bit pattern in real-time, and to load the pattern to a one-dimensional liner array in block 100. A second source for block 100 may be pre-generated random bit patterns. The pre-generated random bit patterns are widely available from open-source communities and can be downloaded from the Internet. These pre-generated random patterns may be stimulated by natural phenomena such as weather, temperature, light/color variations, etc., and are random and unpredictable in nature. A number of government institutes, academic institutes or industrial institutes maintain the sources for these pre-generated random patterns. A third source for block 100 may be bit patterns provided by an organization or an Internet platform. This bit pattern can be very long, e.g., on the order of 1 million bits. The provider of this long bit pattern may send a command to a device that subscribes to a selected service, where the command specifies which sub-pattern (e.g., 256 bits) of the long bit pattern is used for the device-service pair. The long bit pattern can have a long life and rarely change. When the subscribed service changes or when there is a need to re-authenticate the device-service pair, the provider of the long bit pattern can issue another command to the device for a different sub-pattern to be used. In one embodiment, this long bit pattern may be a "cloud_master_ID" and stored in block 100, and the sub-pattern (e.g., 256 bits) may be used as "sub_cloud_master_ID" and stored in block 200.

The two-dimensional data structure in block 200 may store keys extracted from block 100, keys acquired from protocols, keys pre-installed by a manufacturer, keys computed in real time. In one embodiment, the block 200 stores a fixed-sized two-dimensional array data structure with N locations and with each location being M-bit long. Block 200 may be used as the storage structure for the traditional supply chain information such as the manufacturer, product model number, serial number, date and place of manufacturing, and the like. The master_manufacturer_ID can also be stored in this storage structure. When a manufacturer is a member of an industrial consortium, the consortium can issue a master_manufacturer_ID to all of its members. These members can use the full or part of the master_manufacturer_ID (e.g., sub_manufacturer_ID) to conduct business, transaction or inter-member supply chain management. The consortium usually sets up a common protocol for the members to follow when using the master_manufacturer_ID.

In one embodiment, the entries stored in block 200 may be used as keys for a low level of security. For example, the supply chain information may include manufacturer_ID, which further includes data fields such as: manufacturer's name (or code); product model and serial number; date, time and location related to the manufacturing of the product; code related to the distribution of the product (country, supply chain). These data fields have a low security level and may be transmitted as keys in the clear to another network-connected entity.

In one embodiment, the data entries in block 200 may be derived from one or more long bit patterns such as a bit pattern in block 100 (e.g., the cloud_master_ID), or the master_manufacturer_ID in block 200. As mentioned before, bit patterns in block 100 are usually much longer than the key length (typical 128, 256, 512, 1024, 2048, etc.) used in a protocol. To extract a key (which is a sub-pattern) from a long bit pattern, the ID generation engine 120 uses a select_and_mask unit 700 to perform key generation according to a command that specifies the beginning bit location in the bit pattern, the end bit location in the bit pattern, and the number of bits in the bit pattern to skip between successive bits of the sub-pattern; e.g., key=indexing (beginning bit, end bit, skip). The resulting sub-pattern may be stored in block 200; e.g., as sub_cloud_master_ID or sub_manufacturer_ID.

In one embodiment, block 200 may store the supply chain information in a long bit pattern, which may combine identifiers of the manufacturer, product model number, serial number, date and place of manufacturing, group, device, and the like. The select_and_mask unit 700 may be used for extracting a specific ID such as the group ID or device ID from the long bit pattern. In one embodiment, the ID extracted from block 200 may be stored in block 300.

Behind the use of the supply chain information and the master_manufacturer_ID, there is usually a very large database involved. Some database operations are less sensitive, and require low or no security. However, other database operations are highly sensitive hence require high security level. The ID generation engine 120 supports various levels of security. For example, the ID generation engine 120 may retain the master_manufacturer_ID as a "secret," and instead send out an alias of the master_manufacturer_ID to requesters in order to maintain the confidentiality.

Figure 3:
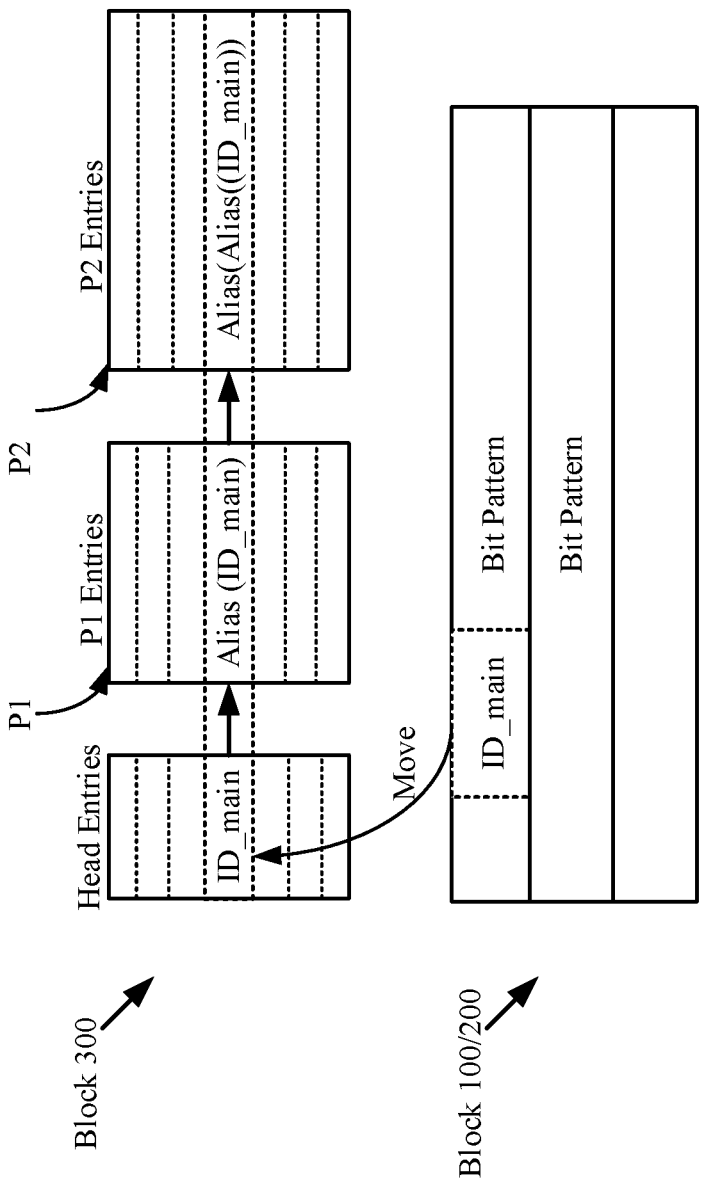
FIG. 3 illustrates an example of a data structure that stores a set of linked lists according to one embodiment.

Referring also to the embodiment shown in FIG. 3, block 300 stores a set of linked lists that support aliasing of the identification with high security. The keys in block 300 may be used as multi-factor keys, for alias keys, for alias of alias keys. Block 300 is initiated to be empty. Block 300 stores a set of linked lists associated with two pointers, namely P1 and P2, where P1 points to a set of P1 entries and P2 points to a set of P2 entries. More specifically, each linked list includes a head entry to store a main identify (shown in FIG. 3 as ID_main), a P1 entry to store a first alias of the main identify, and a P2 entry to store a second alias of the first alias of the main identity. In one embodiment, the main identity may be generated by the select-and-mask unit 700 from the supply chain information in block 200. Alternatively, the main identity may be generated by the select-and-mask unit 700 from the bit pattern in block 100.

In one embodiment, the space in block 300 is managed, allocated and de-allocated by an allocator 400. In response to a request for space allocation, the allocator 400 identifies a free location in block 300, and moves a data segment (which may be an output generated by the select-and-mask unit 700) from block 100 or block 200 to the head entry of that location in block 300. This head entry (i.e., a main identity) may be used to compute ALIAS(main identity), which is stored as a P1 entry associated with the main identify, and ALIAS (ALIAS (main identity)), which is stored as a P2 entry associated with the main identify. ALIAS( ) represents a function that computes the alias of an input argument. In one embodiment, the allocator 400 includes or is coupled to an alias calculator 480 for computing the alias function. In one embodiment, the alias function is a hash function, a one-way function, or another function that derives its output from an input argument.

For a medium level of security, the P1 entry (i.e., the alias of the main identify) may be used as a key. For example, the main identify may be a master_manufacturer_ID, which is defined and provisioned by the manufacturer. Many other keys can be derived from master_manufacturer_ID per the requirement of an industry or a protocol standard. Instead of releasing master_manufacturer_ID, the alias of master_manufacturer_ID can be released by the ID generation engine 120 to another network-connected entity. The association of master_manufacturer_ID and its alias is kept inside the chip or device (e.g., the device 150 of FIG. 1). In addition to master_manufacturer_ID, sub_cloud_master_ID (which is a sub-pattern of cloud_master_ID), manufacturer_device_ID, protocol_acquired_ID, and the like, may be the main identify for which the alias is computed.

For a high level of security, both the P1 entry and the P2 entry may be used to identify a chip or device. In some embodiments, master_manufacturer_ID, sub_cloud_master_ID, manufacturer_device_ID, protocol_acquired_ID and the like may be the main identify for which the alias and the alias of the alias are computed.

In some embodiments, the ID generation engine 120 may be asked to release two or more keys simultaneously to authenticate itself. This is called multi-factor identification (e.g., 2-factor or 3-factor identification). For example, in the 3-factor case, a device may release: main identity, ALIAS (main identity), ALIAS(ALIAS(main identity)) as the three factors, where the main identity may be one of the following: ALIAS(master_manufacturer_ID), sub_cloud_master_ID, manufacturer_device_ID, or protocol_acquired_ID.

The higher levels of security are achieved with some overhead such as the storage of P1 entries and P2 entries, the storage of the pointers P1 and P2, and the allocator 400 dedicated for managing the locations in block 300 as well as the association among the entries of block 300. Additionally, the time spent on computing the alias and managing block 300 is also an overhead.

The ID generation engine 120 further includes the number generator 500, which generates random bit patterns for block 100 and block 200. Several methods for generating random numbers and pseudo-random numbers are known in the art, with different levels of complexity, different amount of generation time, and different degrees of randomness of the resulting numbers.

The ID generation engine 120 further includes an ID generation controller 600 that is the overall control of the ID generation engine 120. The ID generation controller 600 handles protocol-compliant ID generation operations, manages data transfers among blocks 100, 200 and 300, and issues command sequences to all other components in the ID generation engine 120. In one embodiment, the ID generation controller 600 controls the generation of IDs according to inputs that include one or more of the following: a command, a security level, a protocol control signal, and an input key (i.e., ID_in), where ID_in is a bit pattern provided by an external entity. Based on the inputs, the ID generation engine 120 generates an output key, ID_out. The generation controller 600 interfaces with the protocol controller 190, which is outside the ID generation engine 120 and performs operations required by a protocol for communicating with another network-connected entity. The protocol controller 190 may send a protocol control signal to the ID generation engine 120 to provide protocol-related information for ID generation.

The ID generation engine 120 generates IDs that enables the device 150 to be "active." In one embodiment, the device 150 actively listens to the protocol traffic in the network. Once the ID of the device 150 appears in the traffic, the device 150 will actively participate in the protocol data exchange and take appropriate actions. In contrast, a barcoded device and a Radio-Frequency ID (RFID)-based device are not active, because they need to passively wait for their IDs to be scanned.

Figure 4:
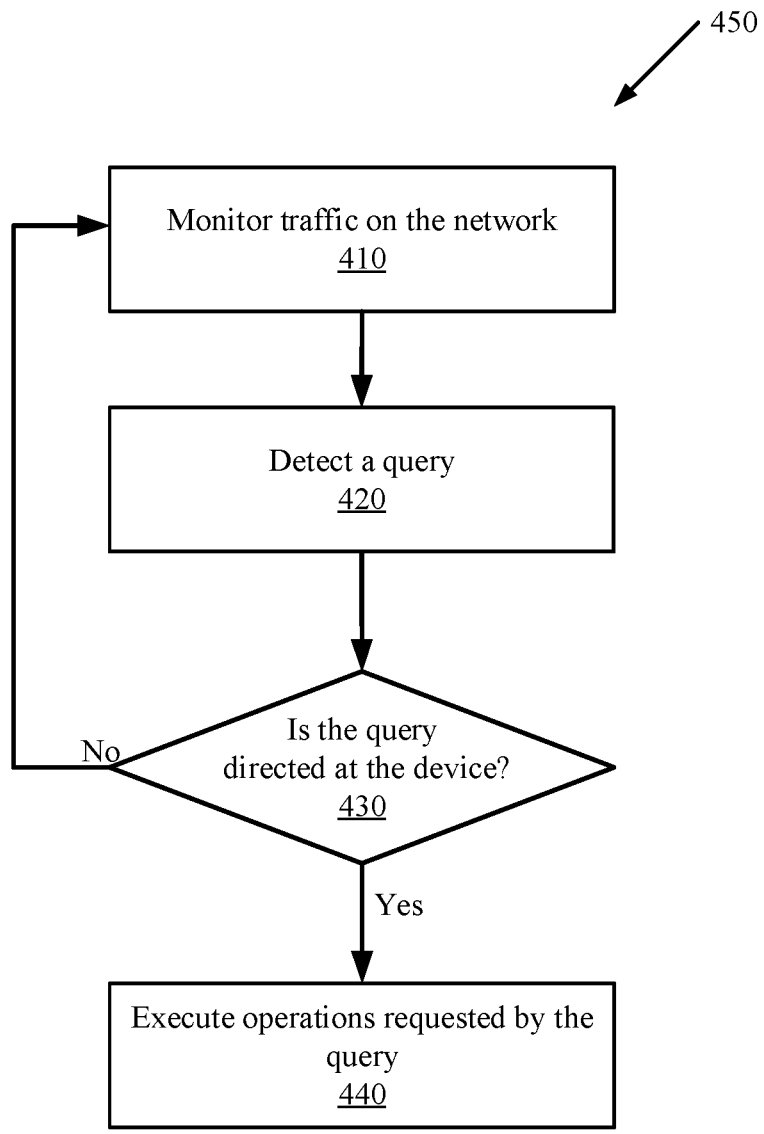
FIG. 4 is a flow diagram illustrating a method for a device to actively using its IDs to interact with other network-connected entities according to an embodiment.

FIG. 4 is a flow diagram illustrating a method 450 for a device to actively using its IDs to interact with other network-connected entities according to an embodiment. In one embodiment, the device may be the device 150 of FIG. 1 in which the ID generation engine 120 is located. The method 450 begins with the device 150 (e.g., the protocol controller 190 or the ID generation controller 600) monitoring the traffic on the network (step 410) to detect the presence of queries. The queries may be sent on the network by broadcast, multicast or directly to the device 150. When a query is detected (step 420), the device 150 determines whether the query is directed at the device 150 (step 430). In the description herein, a query is directed at the device 150 if the query specifically identifies the device 150 as a recipient, if the query identifies a group to which the device 150 belongs, if the query identifies a characteristic that the device 150 possesses, or when other analogous conditions are satisfied.

In one scenario, the query may specify a key or information (e.g., supply chain information) from which a queried key can be derived. If there is a match between the queried key and a stored key, which means that the query is directed at the device 150, the device 150 performs operations requested by the query (step 440). If there is not a match, the method 450 returns to step 410 to monitor the traffic on the network.

In another scenario, at step 430, the ID generation engine 120 may generate a key in real-time based on the information (e.g., the protocol, security level, service, the source of the query, etc.) in the query. Then the key generated in real-time is compared with the queried key to determine whether there is a match (i.e., whether the query is directed at the device 150). If there is a match, the method 450 proceeds to step 440; otherwise, the method 450 returns to step 410.

At step 440, the device 150 may perform operations that are complaint with a given Internet protocol. The device 150 supports at least four universal interfaces between a client and a server, or an endpoint and cloud: bootstrap, registration, device management, and information collection. For example, the query may contain a request for the device 150 to establish a secure communication channel with another network-connected entity, such as a server or a cloud. The device 150 may need to authenticate itself by exchanging keys with the source entity of the query. These authentication keys may be stored keys or keys generated in real-time by the ID generation engine 120. Through the secure communication channel, the server or the cloud may command the device 150 to start a bootstrap process, a registration process, an update process, or an information collection process.

Figure 5:
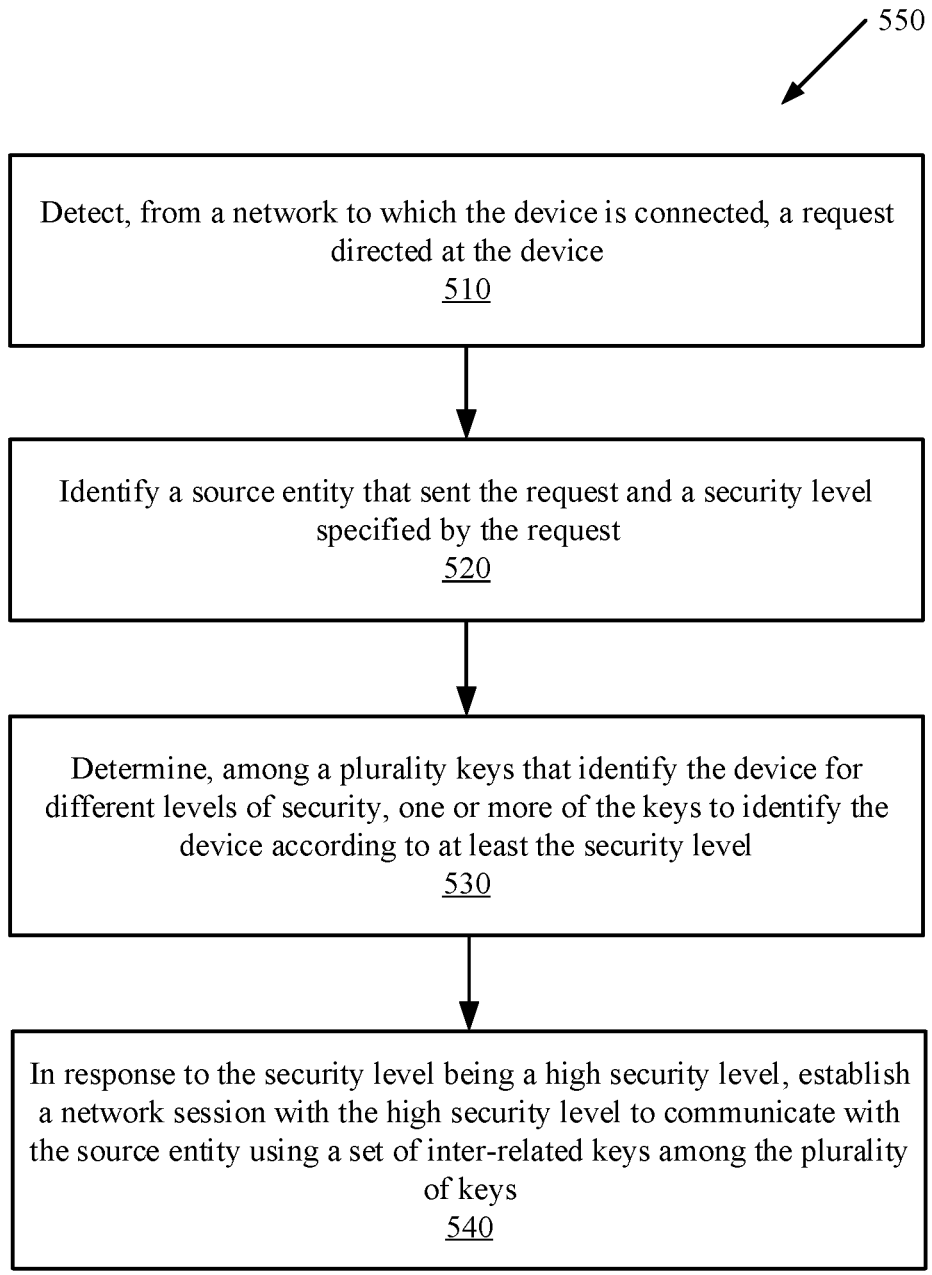
FIG. 5 is a flow diagram illustrating a method for identifying a device in a network session according to one embodiment.

FIG. 5 is flowchart illustrating a method 550 for identifying a device in a network according to one embodiment. In one embodiment, the method 550 may be performed by the device 150 of FIG. 1. The method 550 begins with the device 150 detecting, from the network, a request directed at the device 150 (step 510). The method 450 of FIG. 4 may be used for detecting the request. From the request, the device 150 identifies a source entity that sent the request and a security level of a protocol specified by the request (step 520). Among a plurality keys that identify the device for different levels of security, the device 150 determines one or more of the keys to identify itself according to at least the security level (step 530). In case of the request specifies a high security level, the device 150 establishes a network session with the high security level to communicate with the source entity of the request using a set of inter-related keys among the plurality keys (step 540). In one embodiment, according to the high security level, the ID generation engine 120 of the device 150 retrieves or generates in real-time multi-factor keys (e.g., three-factor keys), which may include a main identity of the device 150, a first alias of the main identity, and a second alias of the first alias of the main identity, as illustrated by the example of FIG. 3.

The operations of the flow diagrams of FIGS. 4 and 5 have been described with reference to the exemplary embodiments of FIGS. 1-3. However, it should be understood that the operations of the flow diagrams of FIGS. 4 and 5 can be performed by embodiments of the invention other than those discussed with reference to FIGS. 1-3, and the embodiments discussed with reference to FIGS. 1-3 can perform operations different than those discussed with reference to the flow diagrams. While the flow diagrams of FIGS. 4 and 5 show a particular order of operations performed by certain embodiments of the invention, it should be understood that such order is exemplary (e.g., alternative embodiments may perform the operations in a different order, combine certain operations, overlap certain operations, etc.).

The disclosure herein describes an ID generation engine that provides multiple names or identifications to a device. The device can actively interact with other network-connected entities over a network. The device uses different keys in different situations that require different security levels; the secure association among the keys is kept inside the device and is never released. Furthermore, the ID generation engine uses fundamental data structures and universal protocol interfaces, which results in a design capable of supporting all industrial standards and all Internet platforms.

While the invention has been described in terms of several embodiments, those skilled in the art will recognize that the invention is not limited to the embodiments described, and can be practiced with modification and alteration within the spirit and scope of the appended claims. The description is thus to be regarded as illustrative instead of limiting.

What is claimed is:

1. A method for identifying a device in a network, comprising:
   detecting, from the network, a request directed at the device;
   identifying, from the request, a source entity that sent the request and a security level specified by the request;

and determining, among a plurality keys that identify the device for different levels of security, one or more of the keys to identify the device according to at least the security level;

and, wherein in response to the security level being a high security level, the method further comprises: performing a select-and-mask operation on a bit pattern stored in the device to obtain a sub-pattern, wherein the select-and-mask operation specifies a beginning bit location in the bit pattern, an end bit location in the bit pattern, and the number of bits in the bit pattern to skip between successive bits of the sub-pattern;

and using two or more inter-related keys including at least the sub-pattern as multi-factor identification for the device to establish a network session with at the high security level to communicate with the source entity, wherein the multi-factor identification for the device comprises two or more alias.

2. The method of claim 1, wherein the two or more inter-related keys are stored in a linked list.

3. The method of claim 1, wherein detecting the request directed at the device further comprises:
monitoring data traffic on the network; and
determining whether a query on the network specifies a key that matches one of the plurality of keys identifying the device.

4. The method of claim 1, further comprising:
in response to the security level being at a lower level than the high security level, selecting the sub-pattern or another sub-pattern from one of bit patterns stored in the device for establishing the network session.

5. The method of claim 4, wherein each of the bit patterns identifies the device to one of other network-connected entities over the network.

6. The method of claim 1, wherein the plurality of keys includes one or more of: random bit patterns, pseudo-random bit patterns, bit patterns generated by the device, and bit patterns provided by an entity external to the device.

7. The method of claim 1, wherein the plurality of keys contain supply chain information.

8. The method of claim 1, further comprising:
performing operations in accordance with the request, wherein the operations include one or more of: bootstrap, registration, device management, and information collection.

9. An apparatus for identifying a device in a network, comprising:
memory to store a plurality keys that identify the device for different levels of security;
an allocator to manage memory allocation for a data structure that stores at least a set of inter-related keys for identifying the device at a high level of security;
and a controller coupled to the memory and the allocator, the controller operative to:
detect, from the network, a request directed at the device;
identify, from the request, a source entity that sent the request and a security level specified by the request;
and determine one or more of the keys among the plurality keys to identify the device according to at least the security level;

and, wherein in response to the security level being the high security level, the controller is further operative to: obtain a sub-pattern from a select-and-mask operation performed on a bit pattern stored in the device, wherein the select-and-mask operation specifies a beginning bit location in the bit pattern, an end bit location in the bit pattern, and the number of bits in the bit pattern to skip between successive bits of the sub-pattern;

and use two or more inter-related keys including at least the sub-pattern as multi-factor identification for the device to establish a network session with at the high security level to communicate with the source entity, wherein the multi-factor identification for the device comprises two or more alias.

10. The apparatus of claim 9, wherein the two or more inter-related keys are stored in a linked list.

11. The apparatus of claim 9, wherein the controller is further operative to:
monitor data traffic on the network; and
determine whether a query on the network specifies a key that matches one of the plurality of keys identifying the device.

12. The apparatus of claim 9, wherein the controller is further operative to:
in response to the security level being at a lower level than the high security level, select the sub-pattern or another sub-pattern from one of bit patterns stored in the device for establishing the network session.

13. The apparatus of claim 12, wherein each of the bit patterns identifies the device to one of other network-connected entities over the network.

14. The apparatus of claim 9, wherein the plurality of keys includes one or more of: random bit patterns, pseudo-random bit patterns, bit patterns generated by the device, and bit patterns provided by an entity external to the device.

15. The apparatus of claim 9, wherein the plurality of keys contain supply chain information.

16. The apparatus of claim 9, wherein the controller is further operative to:
perform operations in accordance with the request, wherein the operations include one or more of: bootstrap, registration, device management, and information collection.

17. The method of claim 1, wherein the two or more inter-related keys include the sub-pattern as multi-factor identification for the device comprises a main identity of the device, a first alias of the main identity, and a second alias of the first alias of the main identity.

18. The apparatus of claim 9, wherein the two or more inter-related keys includes the sub-pattern as multi-factor identification for the device comprises a main identity of the device, a first alias of the main identity, and a second alias of the first alias of the main identity.

* * * * *